April 18, 1933. P. S. RYDBECK 1,904,253
BEARING ROLLER
Filed July 10, 1930

INVENTOR
PATRIK SAMUEL RYDBECK
BY
ATTORNEY

Patented Apr. 18, 1933

1,904,253

UNITED STATES PATENT OFFICE

PATRIK SAMUEL RYDBECK, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN

BEARING ROLLER

Application filed July 10, 1930, Serial No. 467,042, and in Sweden July 11, 1929.

In the manufacture of objects in the form of bodies of revolution which are to be ground or otherwise machined between centres it is necessary to provide the object with centre holes so that it can be supported between the centres during the working operation. It has been found that in objects which are to be hardened or otherwise heat-treated, such as rollers for roller bearings, cracks frequently arise at the centre holes and spread outwards towards the circumference. In the case of rollers for roller bearings which are subjected to heavy loads these cracks may result in the destruction of the roller and may sometimes even result in a cleavage of the roller in two or more parts along axial planes through the centre of the roller.

The object of the present invention is to provide stock suitable for the manufacture of hardened objects in which the spreading of cracks is prevented. The invention consists mainly in that the object is formed from stock consisting of a core and surrounding layers of metal which may or may not be of the same material as the core. A crack which starts at the centre and spreads outwards will be stopped at the junction of the core and the next layer of material and does not continue to this next layer. In rollers for roller bearings in which most cracks start from the centre holes provided for the grinding machine centres the cracks are thus prevented from continuing towards the surface of the roller. It is also apparent that a crack starting at the surface of the roller will in a like manner be prevented from spreading to the core. The complete cleavage of the roller is in this manner impossible.

The core may be of either harder or softer material than the surrounding layer depending on the use to which the object is to be put. The core may also be made of a material which does not become hardened, making it possible to press the centre holes after hardening the surface layer and thus entirely eliminating the tendency to crack.

The stock may be provided with a core in any suitable manner, for example by drilling out the centre of the material and inserting a bar of core material, after which the whole bar is rolled to the required dimensions. Certain core materials may preferably be cast in the hole before rolling. In other cases it may be desirable to cast the outer layer about the core. After the rolling process is completed, the core and the surrounding layer will be sufficiently firmly welded together to serve most purposes. For certain purposes and with certain materials which do not weld together the core may be retained in place by the frictional engagement between the core and the surrounding layer of material. In such cases the friction can be increased by using a core material which expands to a greater extent than the surrounding layer when the object is heat-treated.

The invention is illustrated in the accompanying drawing, in which

Figure 1:
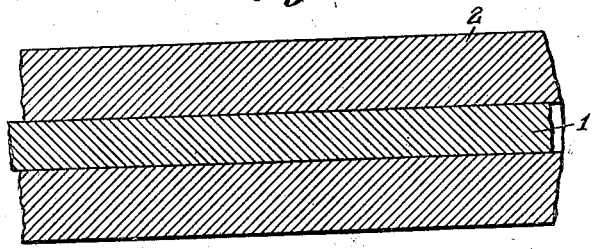
Figure 1 shows an axial section through a part of a bar of material prepared in accordance with my invention.

A broken away piece of stock is illustrated in Fig. 1. The simplest form comprises a core 1 and a surrounding layer 2. The core 1 may be either of the same material as the material of the surrounding layer 2 or may be of a different material which is harder or softer, as the ultimate use of the object to be formed from the stock would indicate.

Figure 2:
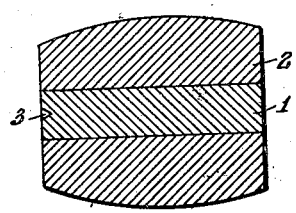
Fig. 2 shows a roller for a roller bearing made from a bar as shown in Fig. 1.

Fig. 2 shows a roller for a roller bearing made from stock such as that illustrated in Fig. 1. According to one method of manufacture the outer layer will be made of steel having a carbon content of 1% and containing 1½% chromium, and in following out my present invention the core will be formed of mild steel.

The core just above indicated is softer after the object has been heat-treated than the surrounding layer. The rolling temperature for reducing the billet to the finished stock and the temperature for hardening the outer layer are not sufficient to cause welding between the core and the outer layer.

According to present approved methods of roller bearing manufacture, the outer layer will be made of steel as above described, i. e. steel having a carbon content of 1% and containing 1½% chromium or any other suitable water hardening steel. The core will be formed of steel having a carbon content of 0,9%, a manganese content of 1% and a chromium content of 1% or any other suitable oil hardening steel. In objects formed from stock having the above mentioned composition the core will expand to a greater extent than the surrounding layer when the object is heat-treated and will therefore be held firmly in place.

The reference character 3 indicates the centre hole or centre punch for the engagement of the centre or centres of the machine used in the manufacture of the object. It is from these centres that cracks frequently develop which are assumed to be originally caused by the heat-treatment. At times some of these cracks also originate in the outer layer of the roller bearing or in some intermediate portion.

Figure 3:
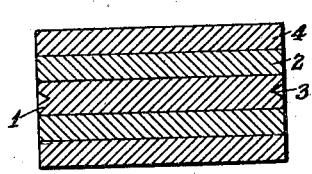
Fig. 3 shows an axial section through an object having a core and two surrounding layers.
Figure 4:
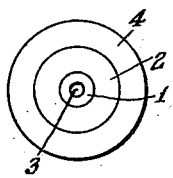
Fig. 4 is an end elevation of the object shown in Fig. 3.

In Figs. 3 and 4 a roller is illustrated which has been formed of stock having a core 1, an outer layer 4 and an intermediate layer 2.

Figure 5:
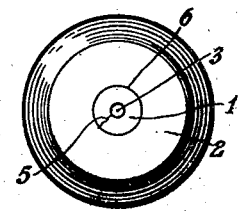
Fig. 5 is an end elevation of the roller shown in Fig. 2 and illustrates the manner in which a crack starting in the core is stopped at the boundary between the core and the surrounding layer.

In Fig. 5, which is intended to represent an end view of the roller shown in Fig. 2, a crack 5 is shown as having started at the centre 3 and extending outwardly through the core 1, but this crack has been successfully stopped by the boundary 6 between the core 1 and the surrounding layer 2.

Having thus described my invention, what I claim and desire to secure by Letters Patent is:

1. As an article of manufacture, a roller for a roller bearing comprising a core formed of steel having a center punch and a surrounding layer formed of steel presenting a sharp division between itself and the core for the purpose of preventing the rise and spread of cracks from the center punch.

2. As an article of manufacture, a roller for a roller bearing comprising a core formed of steel having a center punch and a surrounding layer formed of steel, the core consisting of a steel alloy capable of expanding to a greater extent than does the surrounding layer when the roller is heat-treated.

3. As an article of manufacture, a roller for a roller bearing comprising a core formed of steel having a center punch and a surrounding layer formed of steel, the core consisting of a steel alloy incapable of contracting to as great an extent as does the surrounding layer when the roller is heat-treated.

4. As an article of manufacture, a roller for a roller bearing comprising a core formed of oil hardening steel, and a surrounding layer formed of water hardening steel.

In testimony whereof I have signed my name this 27th day of June, 1930.

PATRIK SAMUEL RYDBECK.